United States Patent
Liu et al.

(10) Patent No.: US 10,037,275 B2
(45) Date of Patent: Jul. 31, 2018

(54) METHOD FOR MANAGING MULTI-CHANNEL MEMORY DEVICE TO HAVE IMPROVED CHANNEL SWITCH RESPONSE TIME AND RELATED MEMORY CONTROL SYSTEM

(71) Applicant: MEDIATEK INC., Hsin-Chu (TW)

(72) Inventors: Chuan Liu, Hsinchu (TW); Wen-Hsuen Kuo, Kaohsiung (TW)

(73) Assignee: MEDIATEK INC., Hsin-Chu (TW)

( * ) Notice: Subject to any disclaimer, the term of this patent is extended or adjusted under 35 U.S.C. 154(b) by 27 days.

(21) Appl. No.: 14/930,665

(22) Filed: Nov. 3, 2015

(65) Prior Publication Data

US 2016/0054947 A1    Feb. 25, 2016

Related U.S. Application Data

(63) Continuation-in-part of application No. PCT/CN2015/087009, filed on Aug. 14, 2015.

(60) Provisional application No. 62/037,842, filed on Aug. 15, 2014.

(51) Int. Cl.
| | |
|---|---|
| G06F 12/00 | (2006.01) |
| G06F 12/02 | (2006.01) |
| G06F 3/06 | (2006.01) |
| G06F 12/06 | (2006.01) |
| G06F 13/16 | (2006.01) |

(52) U.S. Cl.
CPC ........ *G06F 12/0284* (2013.01); *G06F 3/0634* (2013.01); *G06F 12/06* (2013.01); *G06F 13/16* (2013.01); *G06F 13/1694* (2013.01); *G06F 2212/1016* (2013.01); *G06F 2212/251* (2013.01)

(58) Field of Classification Search
None
See application file for complete search history.

(56) References Cited

U.S. PATENT DOCUMENTS

| | | | |
|---|---|---|---|
| 2007/0011394 A1* | 1/2007 | Hsu ................ | G06F 9/3824 711/103 |
| 2008/0005516 A1* | 1/2008 | Meinschein ...... | G06F 1/3225 711/165 |
| 2013/0304981 A1* | 11/2013 | Paz ................. | G06F 13/1694 711/105 |

FOREIGN PATENT DOCUMENTS

| | | |
|---|---|---|
| CN | 1243285 A | 2/2000 |
| CN | 1588335 A | 3/2005 |
| CN | 102541770 A | 7/2012 |
| CN | 102959530 A | 3/2013 |
| WO | 2013095559 A1 | 6/2013 |

OTHER PUBLICATIONS

"International Search Report" dated Oct. 29, 2015 for International application No. PCT/CN2015/087009, International filing date: Aug. 14, 2015.

* cited by examiner

*Primary Examiner* — Daniel D Tsui
(74) *Attorney, Agent, or Firm* — Winston Hsu

(57) ABSTRACT

A method for managing a multi-channel memory device includes at least following steps: when the multi-channel memory device is controlled to operate in an M-channel mode, reserving a partial memory space in the multi-channel memory device that is not used under the M-channel mode, where M and N are positive integers, and M is smaller than N; and when the multi-channel memory device is controlled to switch from the M-channel mode to an N-channel mode, accessing data in the reserved partial memory space used under the N-channel mode.

8 Claims, 6 Drawing Sheets

METHOD FOR MANAGING MULTI-CHANNEL MEMORY DEVICE TO HAVE IMPROVED CHANNEL SWITCH RESPONSE TIME AND RELATED MEMORY CONTROL SYSTEM

CROSS REFERENCE TO RELATED APPLICATIONS

This is a continuation-in-part of PCT application No. PCT/CN2015/087009 (filed on Aug. 14, 2015), which claims the benefit of U.S. provisional application No. 62/037,842 (filed on Aug. 15, 2014). The entire contents of the related applications are incorporated herein by reference.

BACKGROUND

The disclosed embodiments of the present invention relate to accessing a memory device, and more particularly, to a method for managing a multi-channel memory device to have improved channel switch response time and a related memory control system.

Computer technology continues to advance at a remarkable pace, with numerous improvements being made to the performance of both of the processor system and the memory system in a computer system. For example, in response to demands for faster, more efficient computer systems, the processor system may be designed to have higher computing power and operate more quickly for dealing with more tasks. If the operating capability of the memory system fails to meet the bandwidth requirement, the memory system would become a performance bottleneck. Hence, attention has been directed to increasing throughput of the memory system.

A multi-channel memory device may be employed to meet the bandwidth requirement. Taking a dual-channel memory device for example, it has two parallel memory channels operating simultaneously to thereby offer larger data throughput. When the number of memory channels used in the multi-channel memory device is larger, it means the power consumption is higher. Further, the computer system does not always need a large memory bandwidth. When the multi-channel memory device has all of its memory channels active under a condition that the computer system only needs a smaller memory bandwidth, the power utilization may not be optimized. If the computer system is a portable device (e.g., a smartphone) powered by a battery device, the battery life may be shortened due to increased power consumption of the memory system. Thus, there is a need for an innovative design which can effectively manage a multi-channel memory to switch between a low power consumption mode and a high memory bandwidth mode.

SUMMARY

In accordance with exemplary embodiments of the present invention, a method for managing a multi-channel memory device to have improved channel switch response time and a related memory control system are proposed.

According to a first aspect of the present invention, an exemplary method for managing a multi-channel memory device is disclosed. The exemplary method includes: when the multi-channel memory device is controlled to operate in an M-channel mode, reserving a partial memory space in the multi-channel memory device that is not used under the M-channel mode, wherein M and N are positive integers, and M is smaller than N; and when the multi-channel memory device is controlled to switch from the M-channel mode to an N-channel mode, accessing data in the reserved partial memory space used under the N-channel mode.

According to a second aspect of the present invention, an exemplary method for managing a multi-channel memory device is disclosed. The exemplary method includes: when the multi-channel memory device is controlled to switch from an M-channel mode to an N-channel mode, accessing data of at least one first memory region in a partial memory space at M memory channels used under the M-channel mode before accessing data of at least one second memory region in the partial memory space at the M memory channels used under the M-channel mode, wherein M and N are positive integers and M is smaller than N; and a bandwidth requirement associated with the at least one first memory region is higher than a bandwidth requirement associated with the at least one second memory region.

According to a third aspect of the present invention, an exemplary memory control system for managing a multi-channel memory device is disclosed. The exemplary memory control system includes a mode controlling module and a memory access controlling circuit. The mode controlling module is arranged to control the multi-channel memory device to operate in an M-channel mode and control the multi-channel memory device to switch from the M-channel mode to an N-channel mode, wherein M and N are positive integers, and M is smaller than N. When the multi-channel memory device is controlled to operate in the M-channel mode, the memory access controlling circuit is arranged to reserve a partial memory space in the multi-channel memory device that is not used under the M-channel mode; and when the multi-channel memory device is controlled to switch from the M-channel mode to the N-channel mode, the memory access controlling circuit is arranged to perform data access in the reserved partial memory space used under the N-channel mode.

According to a fourth aspect of the present invention, an exemplary memory control system for managing a multi-channel memory device is disclosed. The exemplary memory control system includes a mode controlling module and a memory access controlling circuit. The mode controlling module is arranged to control the multi-channel memory device to switch from an M-channel mode to an N-channel mode, wherein M and N are positive integers, and M is smaller than N. When the multi-channel memory device is controlled to switch from the M-channel mode to the N-channel mode, the memory access controlling circuit is arranged to access data of at least one first memory region in a partial memory space at M memory channels used under the M-channel mode before accessing data of at least one second memory region in the partial memory space at the M memory channels used under the M-channel mode, where a bandwidth requirement associated with the at least one first memory region is higher than a bandwidth requirement associated with the at least one second memory region.

These and other objectives of the present invention will no doubt become obvious to those of ordinary skill in the art after reading the following detailed description of the preferred embodiment that is illustrated in the various figures and drawings.

DETAILED DESCRIPTION

Certain terms are used throughout the description and following claims to refer to particular components. As one skilled in the art will appreciate, manufacturers may refer to a component by different names. This document does not intend to distinguish between components that differ in name but not function. In the following description and in the claims, the terms "include" and "comprise" are used in an open-ended fashion, and thus should be interpreted to mean "include, but not limited to . . . ". Also, the term "couple" is intended to mean either an indirect or direct electrical connection. Accordingly, if one device is coupled to another device, that connection may be through a direct electrical connection, or through an indirect electrical connection via other devices and connections.

The present invention proposes a memory system design which can change the number of active memory channels used in a multi-channel memory device without degrading the user experience of using a computer system. For example, the data migration may be performed to make stored data migrated from a second memory space at a second memory channel to a first memory space at a first memory channel. If the second memory space has no valid data after the data migration is accomplished, the second memory channel and/or associated memory controller may be powered down or may enter the power-saving mode (e.g., self-refresh mode or other operation mode with power consumption lower than the normal mode) for power saving. Further, since the number of memory channels active at the same time may be reduced after the data migration is accomplished, the memory controllers may not need to control data access via all of the memory channels simultaneously. The power consumption can be reduced correspondingly. If the computer system demands more memory bandwidth under certain scenarios, the multi-channel memory device may be controlled to have channel switch to support a larger memory bandwidth. Hence, the data migration may be performed to make stored data migrated from the first memory space at the first memory channel to the second memory space at the second memory channel, thus enabling simultaneous data access of the first memory space at the first memory channel and the second memory space at the second memory channel. However, the required memory bandwidth may not be immediately available due to the time-consuming data migration. The present invention therefore proposes an innovative memory system design which can provide effective memory bandwidth within a shorter channel switch time. In this way, channel switch may be performed without user-aware data migration latency. That is, the user of the computer system may not easily perceive the system response delay caused by the channel switch operation. Further details of the proposed memory system design are described as below.

Figure 1:
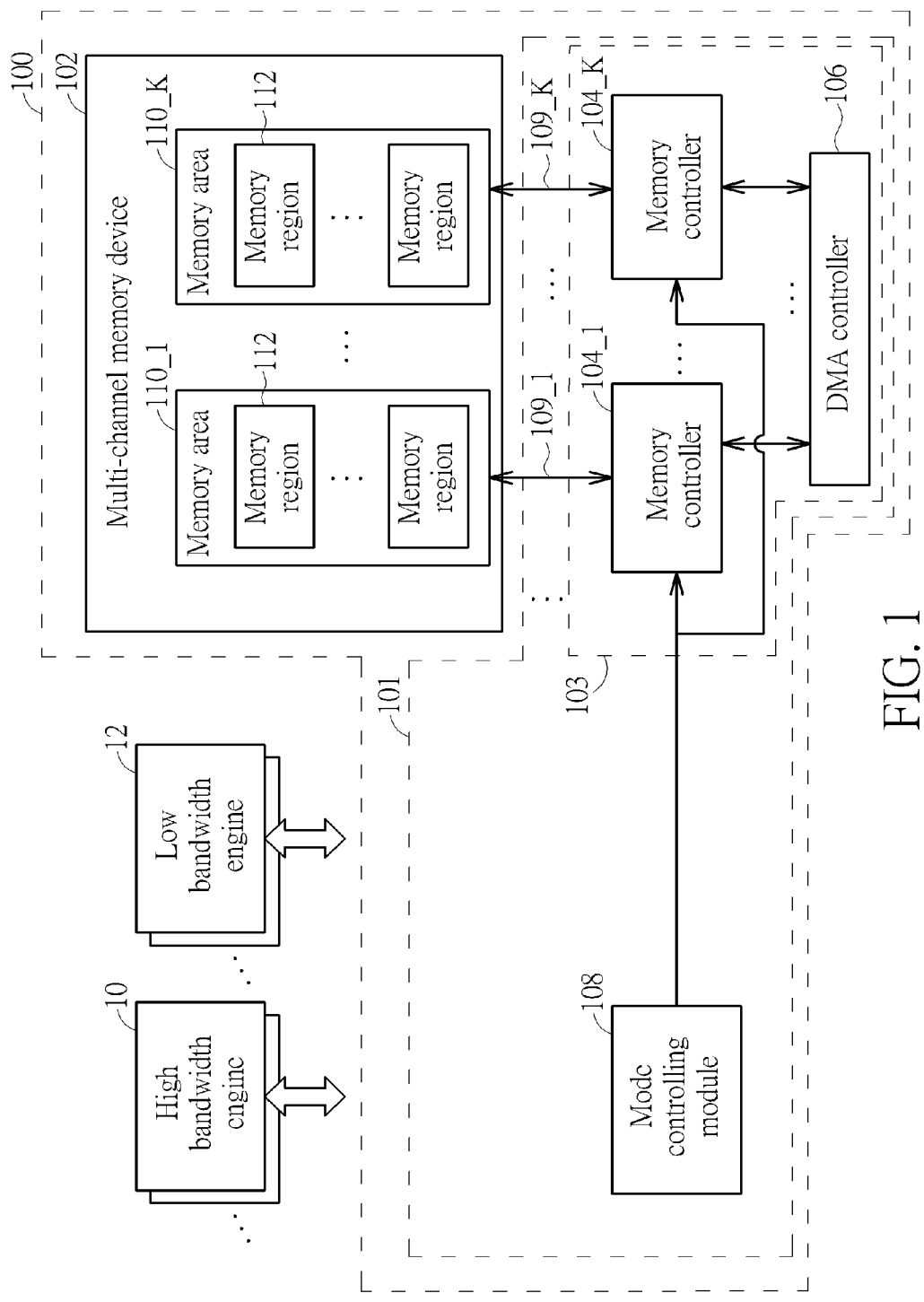
FIG. 1 is a block diagram illustrating a memory system according to an embodiment of the present invention.

FIG. 1 is a block diagram illustrating a memory system according to an embodiment of the present invention. The memory system 100 may be part of a computer system. For example, the memory system 100 may be implemented in a portable device, such as a tablet, a smartphone, or a wearable device. The memory system 100 may include a memory control system 101 and a multi-channel memory device (e.g., a dynamic random access memory) 102. The memory control system 101 may include a memory access controlling circuit 103 and a mode controlling module 108, where the memory access controlling circuit 103 may include a plurality of memory controllers 104_1-104_K and a direct memory access (DMA) controller 106. The mode controlling module 108 may be implemented using dedicated hardware, or may be implemented using software or firmware running on a processor. In this embodiment, the multi-channel memory device 102 may have a plurality of memory areas 110_1-110_K accessed via a plurality of memory channels 109_1-109_K, respectively. The memory controllers 104_1-104_K may be configured to control data access (i.e., read and write) of the memory areas 110_1-110_K, respectively. Hence, the number of memory controllers 104_1-104_K may be equal to the number of memory areas 110_1-110_K, and may also be equal to the number of memory channels 109_1-109_K. Alternatively, the number of memory controller may be smaller than the number of memory areas, and may also be smaller than the number of memory channels. That is, one memory controller may be configured to control data access (i.e., read and write) of more than one memory area via more than one memory channel. This also falls within the scope of the present invention.

It should be noted that value of K may be any positive number not smaller than two. In other words, the value of K may be adjusted, depending upon actual design considerations. For example, when K=2, a dual-channel memory device may be employed. For another example, when K=4, a quad-channel memory device may be employed. Each of the memory areas 110_1-110_K may have a plurality of memory regions 112 addressed by different memory addresses. The multi-channel memory device 102 may include one or more memory dies/chips. In one embodiment, each of the memory areas 110_1-110_K may include one or more memory dies/chips.

The memory system 100 may be used by one or more high bandwidth engines 10 and one or more low bandwidth engines 12 for data storage, where a bandwidth requirement of each high bandwidth engine 10 may be higher than a bandwidth requirement of each low bandwidth engine 12. In this embodiment, the mode controlling module 108 may be arranged to check a system load status and/or a display screen on/off status to determine if a computer system using the memory system 100 demands a higher memory bandwidth (e.g., heavy system load and/or turned-on display screen) or a lower memory bandwidth (e.g., light system load and/or turned-off display screen), and may refer to a checking result to control the multi-channel memory device 102 to operate in one of a plurality of different modes, including an M-channel mode (e.g., low power consumption/memory bandwidth mode) and an N-channel mode (e.g., high power consumption/memory bandwidth mode). The values of M and N may be positive integers (i.e., M≥1 and N≥1), the value of M may be smaller than the value of N, and the value of N may be smaller than or equal to the value of K. In one exemplary design, the value of N may be equal to the value of K and may be an integer multiple of the value of M. For example, N=K=4 and M=2.

In other words, the mode controlling module 108 may control the multi-channel memory device 102 to switch between operation modes with different active memory channel numbers. For example, when the computer system using the memory system 100 does not demand a high memory bandwidth, the mode controlling module 108 may enable the M-channel mode by disabling (e.g. powering down) a portion of the memory channels 109_1-109_K and associated memory controllers 104_1-104_K, thus only allowing M memory channels and associated M memory controllers to be active. In this way, the power consumption of the memory system 100 can be effectively reduced. For another example, when the computer system using the memory system 100 demands a high memory bandwidth, the mode controlling module 108 may enable the N-channel mode by enabling more of the memory channels 109_1-109_K and more of associated memory controllers 104_1-104_K, thus allowing N memory channels and associated N memory controllers to be active. In this way, the memory device 102 may meet the high bandwidth requirement.

With regard to the DMA controller 106, it may be used to act as a data migration control circuit for performing the data migration in response to the channel switch operation. The DMA controller 106 may control data migration of stored data in a DMA manner. Hence, the DMA controller 106 may perform the data migration to make stored data migrated from a partial memory space at a second memory channel to a partial memory space at a first memory channel when the memory system 100 is required to operate under a first channel number, and the DMA controller 106 may perform the data migration to make stored data migrated from the partial memory space at the first memory channel to the partial memory space at the second memory channel when the memory system 100 is required to operate under a second channel number different from the first channel number. In this embodiment, the DMA controller 106 and the mode controlling module 108 are shown as separate functional blocks. Alternatively, the DMA controller 106 may be integrated with the mode controlling module 108. That is, a single circuit may be configured to perform functions of the mode controlling module 108 and the DMA controller 106.

As mentioned above, when the multi-channel memory device is controlled to switch from the M-channel mode to the N-channel mode, the required memory bandwidth may not be immediately available due to the time-consuming data migration. The present invention therefore proposes an innovative memory management design which can provide effective memory bandwidth within a shorter channel switch time. For better understanding of technical features of the present invention, several examples of managing the multi-channel memory device 102 to have improved channel switch response time are detailed as below. For clarity and simplicity, the following assumes that N=K=4 and M=2. However, this is for illustrative purposes only, and is not meant to be a limitation of the present invention. That is, the same concept may be applied to different multi-channel memory devices. These alternative designs all fall within the scope of the present invention.

Figure 2:
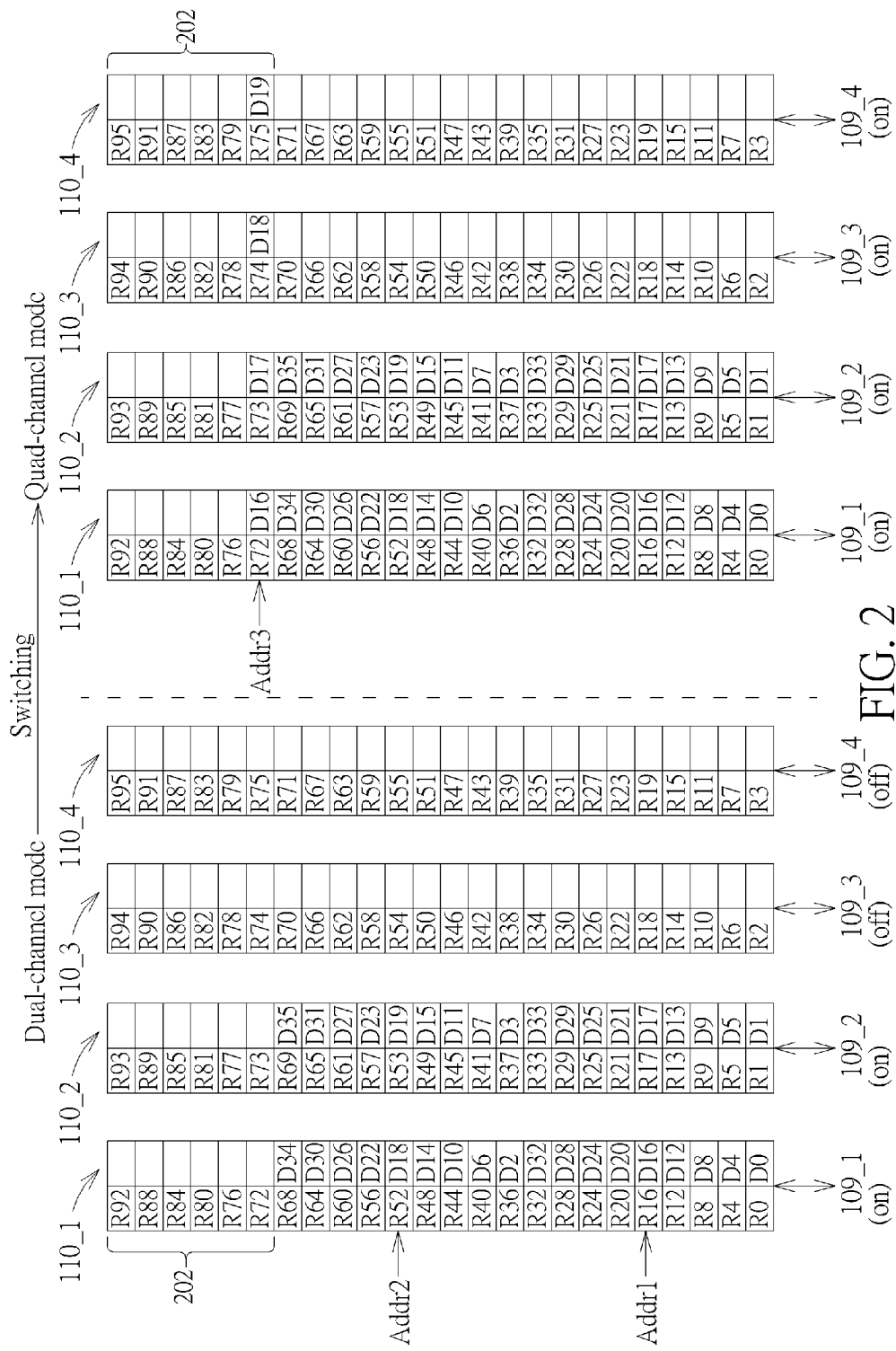
FIG. 2 is a diagram illustrating an example of managing a multi-channel memory device according to a first embodiment of the present invention.

FIG. 2 is a diagram illustrating an example of managing the multi-channel memory device 102 according to a first embodiment of the present invention. As shown in FIG. 2, the multi-channel memory device 102 may include four memory areas 110_1-110_K (K=4) that may be accessed via four memory channels 109_1-109_K (K=4). When the multi-channel memory device 102 is controlled to operate under an M-channel mode (e.g., dual-channel mode with M=2), the memory areas 110_1-110_2 and the associated memory channels 109_1-109_2 may be active, while the memory areas 110_3-110_4 and the associated memory channels 109_3-109_4 may be disabled (e.g. powered down) or may enter the power-saving mode (e.g., self-refresh mode or other operation mode with power consumption lower than the normal mode). That is, the multi-channel memory device 102 may be partially active under the M-channel mode (i.e., dual-channel mode with M=2). When the multi-channel memory device 102 is controlled to operate under an N-channel mode (e.g., quad-channel mode with N=K=4=2×M), the memory areas 110_1-110_4 and the associated memory channels 109_1-109_4 may be active. That is, the multi-channel memory device 102 may be fully active under the N-channel mode (e.g., quad-channel mode with N=K=4=2×M).

As shown in FIG. 2, the memory area 110_1 may include a plurality of memory regions R0, R4, R8, . . . , R92; the memory area 110_2 may include a plurality of memory regions R1, R5, R9, . . . , R93; the memory area 110_3 may include a plurality of memory regions R2, R6, R10, . . . , R94; and the memory area 110_4 may include a plurality of memory regions R3, R7, R11, . . . , R95. When the multi-channel memory device 102 is controlled to operate under an N-channel mode (e.g., quad-channel mode with N=K=4=2×M), a quad-channel memory space composed of memory regions R0-R35 may be used in the quad-channel mode, where four memory regions may be accessed in parallel according to a memory address set composed of a plurality of memory addresses. With regard to the quad-channel mode, each memory address set may include four adjacent memory addresses that may be equally spaced by the same offset, where the offset may be adjusted, depending upon the actual design consideration. For example, four memory regions R0-R3 may be accessed by using a memory address set composed of a plurality of memory addresses (e.g., four adjacent memory addresses that may be equally spaced by the same offset), four memory regions R4-R7 may be accessed by using a memory address set composed of a plurality of memory addresses (e.g., four adjacent memory addresses that may be equally spaced by the same offset), and four memory regions R8-R11 may be accessed by using a memory address set composed of a plurality of memory addresses (e.g., four adjacent memory addresses that may be equally spaced by the same offset). Hence, data D0-D35 may be accessed in the memory regions R0-R35, respectively.

When the multi-channel memory device 102 is controlled to switch from the N-channel mode (e.g., quad-channel mode with N=K=4=2×M) to the M-channel (e.g., dual-channel mode with M=2), valid data in one partial memory space at L memory channels (which may be across the memory channels 109_3 and 109_4 and may be composed of memory regions R2, R3, R6, R7, . . . , R34, R35, if L is a positive integer such as 2) may be controlled by the memory access controlling circuit 103 (particularly, DMA controller 106) to migrate to another partial memory space at M memory channels (which may be across the memory channels 109_1 and 109_2 and may be composed of memory regions R36, R37, R40, R41, . . . , R68, R69, if M=2). For example, assuming that all of the stored data D2, D3, D6, D7, . . . , D34, D35 in the memory regions R2, R3, R6, R7, . . . , R34, R35 may be valid data, the stored data D2, D3, D6, D7, . . . , D34, D35 may be controlled to migrate to the memory regions R36, R37, R40, R41, . . . , R68, R69, as shown in the left part of FIG. 2. With regard to the dual-channel mode, each memory address set may include two adjacent memory addresses that may be equally spaced by the same offset, where the offset may be adjusted, depending upon the actual design consideration. As a result, a group of data D0, D1, D2, D3 may be accessed by using two different memory address sets, including one memory address set directed to memory regions R0 and R1 and the other memory address set directed to the memory regions R36 and R37. Similarly, a group of data D4, D5, D6, D7 may be accessed by using two different memory address sets, including one memory address set directed to memory regions R4 and R5 and the other memory address set directed to the memory regions R40 and R41; and a group of data D32, D33, D34, D35 may be accessed by using two different memory address sets, including one memory address set directed to memory regions R32 and R33 and the other memory address set directed to the memory regions R68 and R69.

In this embodiment, when the multi-channel memory device 102 is controlled to operate in the M-channel mode (e.g., dual-channel mode with M=2), a partial memory space 202 (which may be across the memory channels 109_1-109_4 and may be composed of memory regions R72-R95) is reserved by the memory access controlling circuit 103. The partial memory space 202 may be blocked from being used under the M-channel mode (e.g., dual-channel mode with M=2), and may be allowed to be used under the N-channel mode (e.g., quad-channel mode with N=4). The reserved partial memory space 202 may have no valid data stored therein when the multi-channel memory device 102 is controlled to operate in the M-channel mode (e.g., dual-channel mode with M=2). Since the reserved partial memory space 202 is empty at the time the N-channel mode (e.g., quad-channel mode with N=4) is enabled, the reserved partial memory space 202 may be ready to satisfy the high memory bandwidth requirement. For example, the reserved partial memory space 202 may be ready to serve memory access requests issued from high bandwidth engines 10.

For example, before, when or after the multi-channel memory device 102 is controlled to switch from the N-channel mode (e.g., quad-channel mode with N=4) to the M-channel mode (e.g., dual-channel mode with M=2), data migration may be performed upon the partial memory space 202, such that any valid data in the partial memory space 202 is controlled to migrate to a partial memory space composed of unused memory regions such as R36, R37, R40, R41, . . . , R68, R69. In this way, the partial memory space 202 may become an empty partial memory space when the multi-channel memory device 102 is controlled to operate in the M-channel mode (e.g., dual-channel mode with M=2).

When the multi-channel memory device 102 is controlled to switch from the M-channel mode (e.g., dual-channel mode with M=2) to the N-channel mode (e.g., quad-channel mode with N=4), the memory access controlling circuit 103 may perform data access in the reserved partial memory space 202 for satisfying the high memory bandwidth requirement (e.g., memory access requests issued from the high bandwidth engines 10). By way of example, but not limitation, the high bandwidth engines 10 may include a display engine for processing image data stored in the multi-channel memory device and driving a display screen, a processing engine for processing a camera output and storing the processed camera output into the multi-channel memory device, etc. In other words, when the multi-channel memory device 102 is controlled to switch from the M-channel mode (e.g., dual-channel mode with M=2) to the N-channel mode (e.g., quad-channel mode with N=4), the mode controlling module 108 may instruct a first engine (e.g., high bandwidth engine 10) to access data in the reserved partial memory space 202 across the memory channels 109_1-109_4, and may not instruct a second engine (e.g., low bandwidth engine 12) to access data in the reserved partial memory space 202 across the memory channels 109_1-109_4, where a bandwidth requirement of the first engine is higher than a bandwidth requirement of the second engine.

In addition, when the multi-channel memory device 102 is controlled to switch from the M-channel mode (e.g., dual-channel mode with M=2) to the N-channel mode (e.g., quad-channel mode with N=4), valid data in one partial memory space at M memory channels (which may be across the memory channels 109_1 and 109_2 and may be composed of memory regions R36, R37, R40, R41, . . . , R68, R69, if M=2) may be controlled by the memory access controlling circuit 103 (particularly, DMA controller 106) to migrate to another partial memory space at L memory channels (which may be across the memory channels 109_3 and 109_4 and may be composed of memory regions R2, R3, R6, R7, . . . , R34, R35, if L=2). Consider a case where data D18 and D19 stored in the memory regions R52 and R53 does not migrate to the memory regions R18 and R19 yet, and a group of data D16, D17, D18, D19 stored in the memory regions R16, R17, R52, R53 is requested by a high bandwidth engine 10. The high bandwidth engine 10 may first access old data D16, D17, D18, D19 stored in the memory regions R16, R17, R52, R53 at two memory address sets Addr1 and Addr2, and then access following data D16, D17, D18, D19 in the memory regions R72, R73, R74, R75 at a single memory address set Addr3, as illustrated in the right part of FIG. 2. Consider another case where data D16, D17, D18, D19 stored in the memory regions R16, R17, R52, R53 may be controlled to migrate to the reserved partial memory space 202 at the time the M-channel mode (e.g., dual-channel mode with M=2) is switched to the N-channel mode (e.g., quad-channel mode with N=4), the high bandwidth engine 10 may access the requested data D16, D17, D18, D19 at the single memory address set Addr3. In another example, the data D16, D17, D18, D19 may be copied to the reserved partial memory space 202 before or when the M-channel mode (e.g., dual-channel mode with M=2) is switched to the N-channel mode (e.g., quad-channel mode with N=4), so that the high bandwidth engine 10 may access the requested data D16, D17, D18, D19 at the reserved partial memory space 202.

It should be noted that the memory access controlling circuit 103 may perform data access in the reserved partial memory space 202 across the N memory channels used under the N-channel mode while controlling data of one partial memory space at M memory channels used under the M-channel mode to migrate to another partial memory space at L memory channels not used under the M-channel mode, where M, N and L may be positive integers, and the M memory channels and the L memory channels may be included in the N memory channels. Though the data migration for stored data is not complete yet, the high bandwidth engine 10 may get the desired memory bandwidth provided by the reserved partial memory space 202 in a short time.

Figure 3:
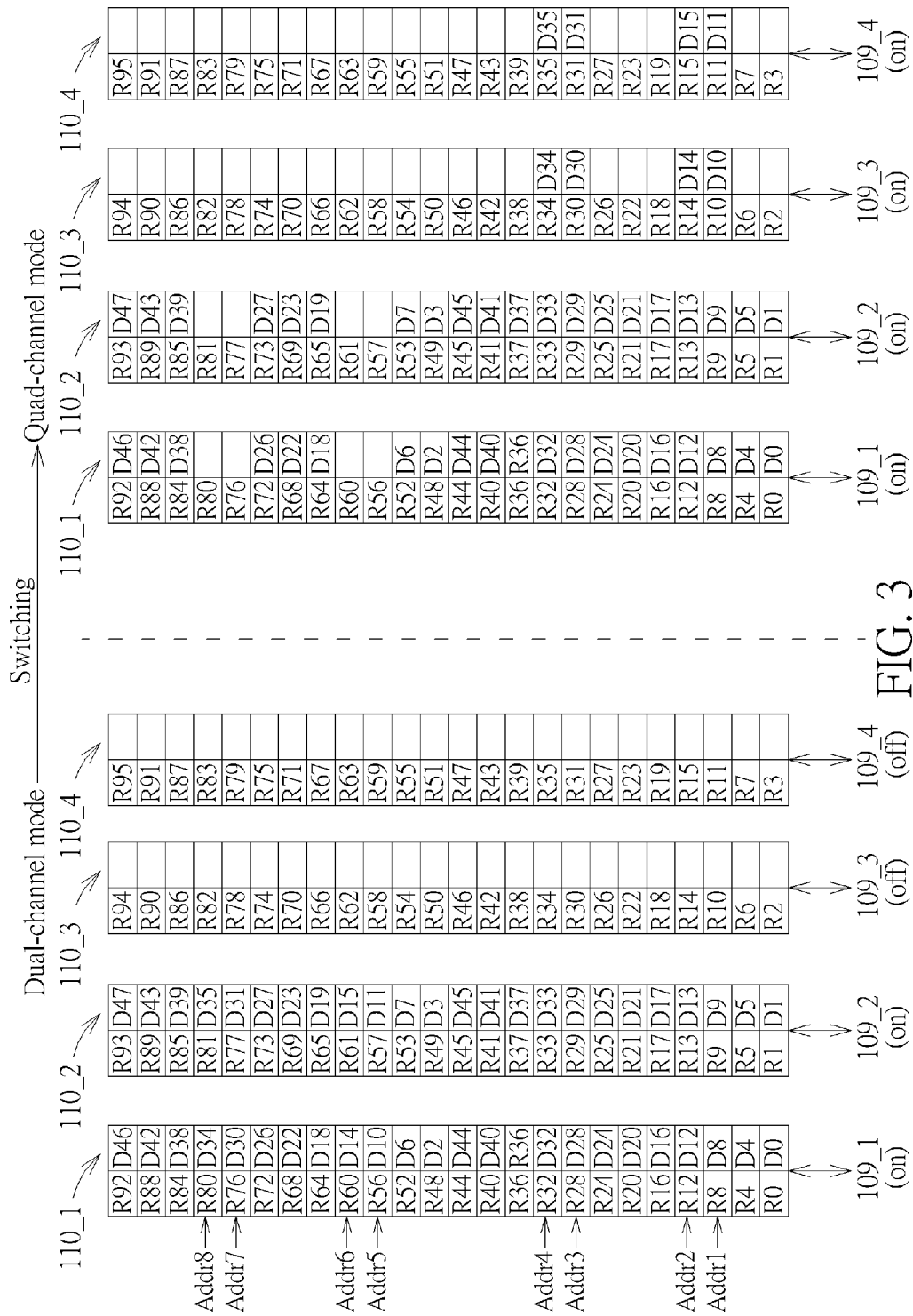
FIG. 3 is a diagram illustrating an example of managing a multi-channel memory device according to a second embodiment of the present invention.

FIG. 3 is a diagram illustrating an example of managing the multi-channel memory device 102 according to a second embodiment of the present invention. As shown in FIG. 3, the multi-channel memory device 102 may include four memory areas 110_1-110_K (K=4) that may be accessed via four memory channels 109_1-109_K (K=4). When the multi-channel memory device 102 is controlled to operate under an M-channel mode (e.g., dual-channel mode with M=2), the memory areas 110_1-110_2 and the associated memory channels 109_1-109_2 may be active, while the memory areas 110_3-110_4 and the associated memory channels 109_3-109_4 may be disabled (e.g. powered down) or may enter the power-saving mode (e.g., self-refresh mode or other operation mode with power consumption lower than the normal mode). That is, the multi-channel memory device 102 may be partially active under the M-channel mode (e.g., dual-channel mode with M=2). When the multi-channel memory device 102 is controlled to operate under an N-channel mode (e.g., quad-channel mode with N=K=4=2×M), the memory areas 110_1-110_4 and the associated memory channels 109_1-109_4 may be active. That is, the multi-channel memory device 102 may be fully active under the N-channel mode (e.g., quad-channel mode with N=K=4=2×M).

As shown in FIG. 3, the memory area 110_1 may include a plurality of memory regions R0, R4, R8, . . . , R92; the memory area 110_2 may include a plurality of memory regions R1, R5, R9, . . . , R93; the memory area 110_3 may include a plurality of memory regions R2, R6, R10, . . . , R94; and the memory area 110_4 may include a plurality of memory regions R3, R7, R11, . . . , R95. In this embodiment, a quad-channel memory space composed of memory regions R0-R47 may be used in the quad-channel mode, where four memory regions may be accessed in parallel according to a memory address set. With regard to the quad-channel mode, each memory address set may include four adjacent memory addresses that may be equally spaced by the same offset, where the offset may be adjusted, depending upon the actual design consideration. For example, four memory regions R0-R3 may be accessed by using a memory address set, four memory regions R4-R7 may be accessed by using a memory address set, and four memory regions R8-R11 may be accessed by using a memory address set. Hence, when the multi-channel memory device 102 is controlled to operate in the N-channel mode (e.g., quad-channel mode with N=4), data D0-D47 may be accessed in the memory regions R0-R47, respectively.

When the multi-channel memory device 102 is controlled to switch from the N-channel mode (e.g., quad-channel mode with N=4) to the M-channel mode (e.g., dual-channel mode with M=2), valid data in one partial memory space at L memory channels (which may be across the memory channels 109_3 and 109_4 and may be composed of memory regions R2, R3, R6, R7, . . . , R46, R47, if L=2) may be controlled by the memory access controlling circuit 103 (particularly, DMA controller 106) to migrate to another partial memory space at M memory channels (which may be across the memory channels 109_1 and 109_2 and may be composed of memory regions R48, R49, R52, R53, . . . , R92, R93, if M=2). For example, assuming that all of the stored data D2, D3, D6, D7, . . . , D46, D47 in the memory regions R2, R3, R6, R7, . . . , R46, R47 may be valid data, the stored data D2, D3, D6, D7, . . . , D46, D47 may be controlled to migrate to the memory regions R48, R49, R52, R53, . . . , R92, R93, as shown in the left part of FIG. 3. With regard to the dual-channel mode, each memory address set may include two adjacent memory addresses that may be equally spaced by the same offset, where the offset may be adjusted, depending upon the actual design consideration. As a result, a group of data D0, D1, D2, D3 may be accessed by using two different memory address sets, including one memory address set directed to memory regions R0 and R1 and the other memory address set directed to the memory regions R48 and R49. Similarly, a group of data D4, D5, D6, D7 may be accessed by using two different memory address sets, including one memory address set directed to memory regions R4 and R5 and the other memory address set directed to the memory regions R52 and R53; and a group of data D44, D45, D46, D47 may be accessed by using two different memory address sets, including one memory address set directed to memory regions R44 and R45 and the other memory address set directed to the memory regions R92 and R93.

In this embodiment, when the multi-channel memory device 102 is controlled to operate in the M-channel mode (e.g., dual-channel mode with M=2), the memory access controlling circuit 103 may record memory addresses of memory regions associated with a high memory bandwidth requirement (e.g., memory regions accessed by high bandwidth engines 10 and/or memory regions with access frequency higher than a threshold). For example, one group of data D8, D9, D10, D11 stored in the memory regions R8, R9, R56, R57 and another group of data D12, D13, D14, D15 stored in the memory regions R12, R13, R60, R61 may be accessed by one high bandwidth engine 10 under the M-channel mode (e.g., dual-channel mode with M=2); and one group of data D28, D29, D30, D31 stored in the memory regions R28, R29, R76, R77 and another group of data D32, D33, D34, D35 stored in the memory regions R32, R33, R80, R81 may be accessed by another high bandwidth engine 10 under the M-channel mode (e.g., dual-channel mode with M=2). Hence, the memory address sets Addr5-Addr8, each composed of a plurality of memory addresses, may be recorded by the DMA controller 106 in an internal storage device (e.g., a static random access memory, a register, etc.) or an external storage device (e.g., a dynamic random access memory).

When the multi-channel memory device 102 is controlled to switch from the M-channel mode (e.g., dual-channel mode with M=2) to the N-channel mode (e.g., quad-channel mode with N=4), the memory access controlling circuit 103 may control data of at least one first memory region in one partial memory space at M memory channels (which may be composed of memory regions R48, R49, R52, R53, . . . , R92, R93 and may be across M memory channels 109_1, 109_2 used under the M-channel mode, if M=2) to migrate to another partial memory space at L memory channels (which may be composed of memory regions R2, R3, R6, R7, . . . , R46, R47 and may be across L memory channels 109_3, 109_4 not used under the M-channel mode, if L=2) before controlling data of at least one second memory region in one partial memory space at M memory channels (which may be composed of memory regions R48, R49, R52, R53, . . . , R92, R93 and may be across M memory channels 109_1, 109_2 used under the M-channel mode, if M=2) to migrate to another partial memory space at L memory channels (which may be composed of memory regions R2, R3, R6, R7, . . . , R46, R47 and may be across another M memory channels 109_3, 109_4 not used under the M-channel mode, if L=2), where a bandwidth requirement associated with the at least one first memory region is higher than a bandwidth requirement associated with the at least one second memory region. For example, the at least one first memory region is accessed by a first engine (e.g., high bandwidth engine 10), the at least one second memory region is accessed by a second engine (e.g., low bandwidth engine 12), and a bandwidth requirement of the first engine is higher than a bandwidth requirement of the second engine.

As shown in the right part of FIG. 3, the memory access controlling circuit 103 (particularly, DMA controller 106) may refer to the recorded memory address sets Addr7-Addr8, each composed of a plurality of memory addresses, to perform data migration upon data D30, D31, D34, D35 stored in the memory regions R76, R77, R80, R81 addressed by the recorded memory address sets Addr7-Addr8, and then may refer to the recorded memory address sets Addr5-Addr6, each composed of a plurality of memory addresses, to perform data migration upon data D10, D11, D14, D15 stored in the memory regions R56, R57, R60, R61 addressed by the recorded memory address sets Addr5-Addr6. Since the data D10-D11, D14-D15, D30-D31, D34-D35 at the memory address sets Addr5-Addr8 may be regarded as high bandwidth data, the data migration may move the high bandwidth data prior to moving the low bandwidth data. In accordance with the proposed memory management design, the priority of performing data migration upon memory regions associated with a high memory bandwidth requirement (e.g., memory regions accessed by high bandwidth engines 10 and/or memory regions with access frequency higher than a threshold) may be higher than the priority of performing data migration upon memory regions associated with a low memory bandwidth requirement (e.g., memory regions accessed by low bandwidth engines 12 and/or memory regions with access frequency not higher than the threshold) when the multi-channel memory device 102 is controlled to switch from the M-channel mode (e.g., dual-channel mode with M=2) to the N-channel mode (e.g., quad-channel mode with N=4). In this way, the high bandwidth requirement may be satisfied in a short time. For example, the high bandwidth engine may get the desired memory bandwidth in a short time.

Figure 4:
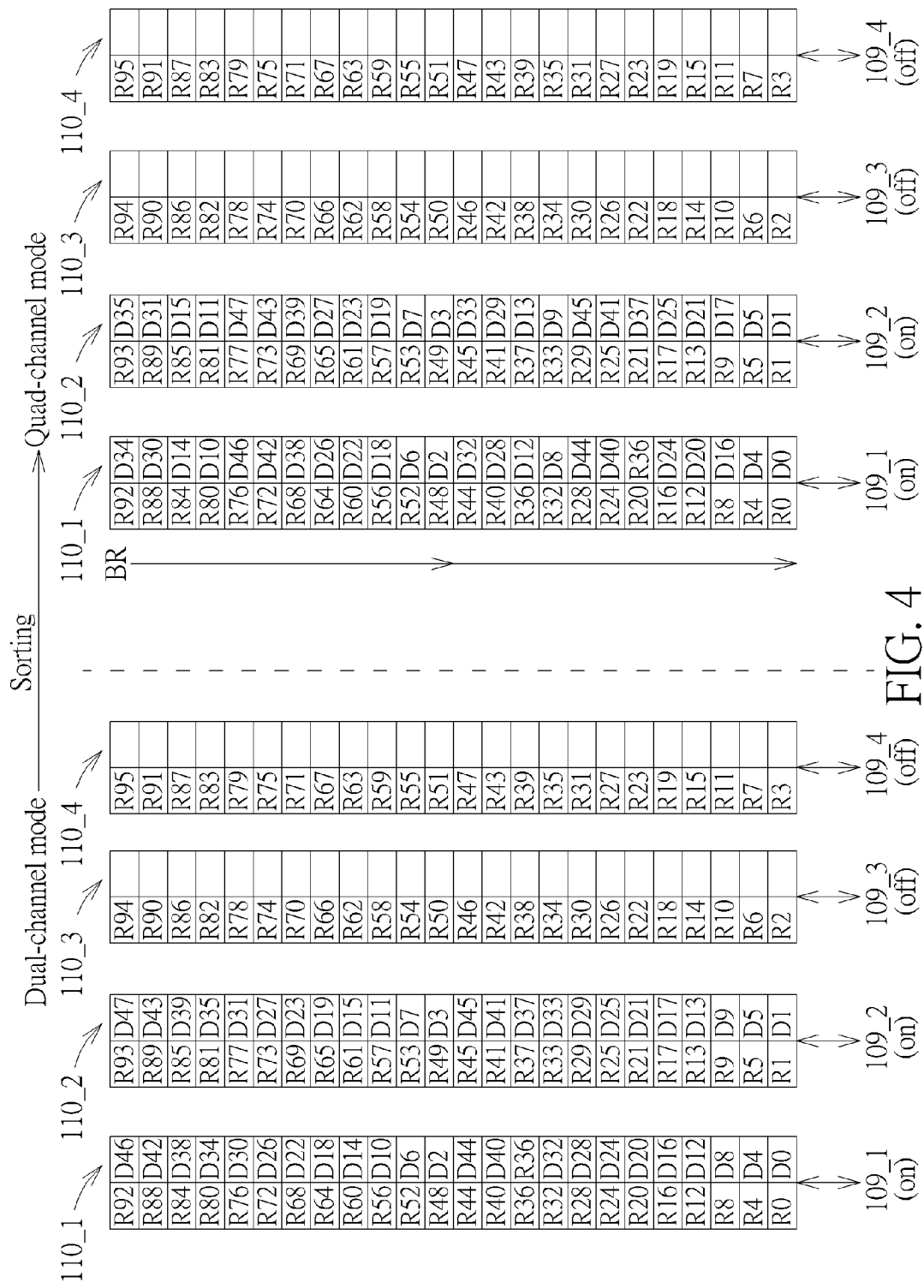
FIGS. 4-5 are diagrams illustrating an example of managing a multi-channel memory device according to a third embodiment of the present invention.
Figure 5:
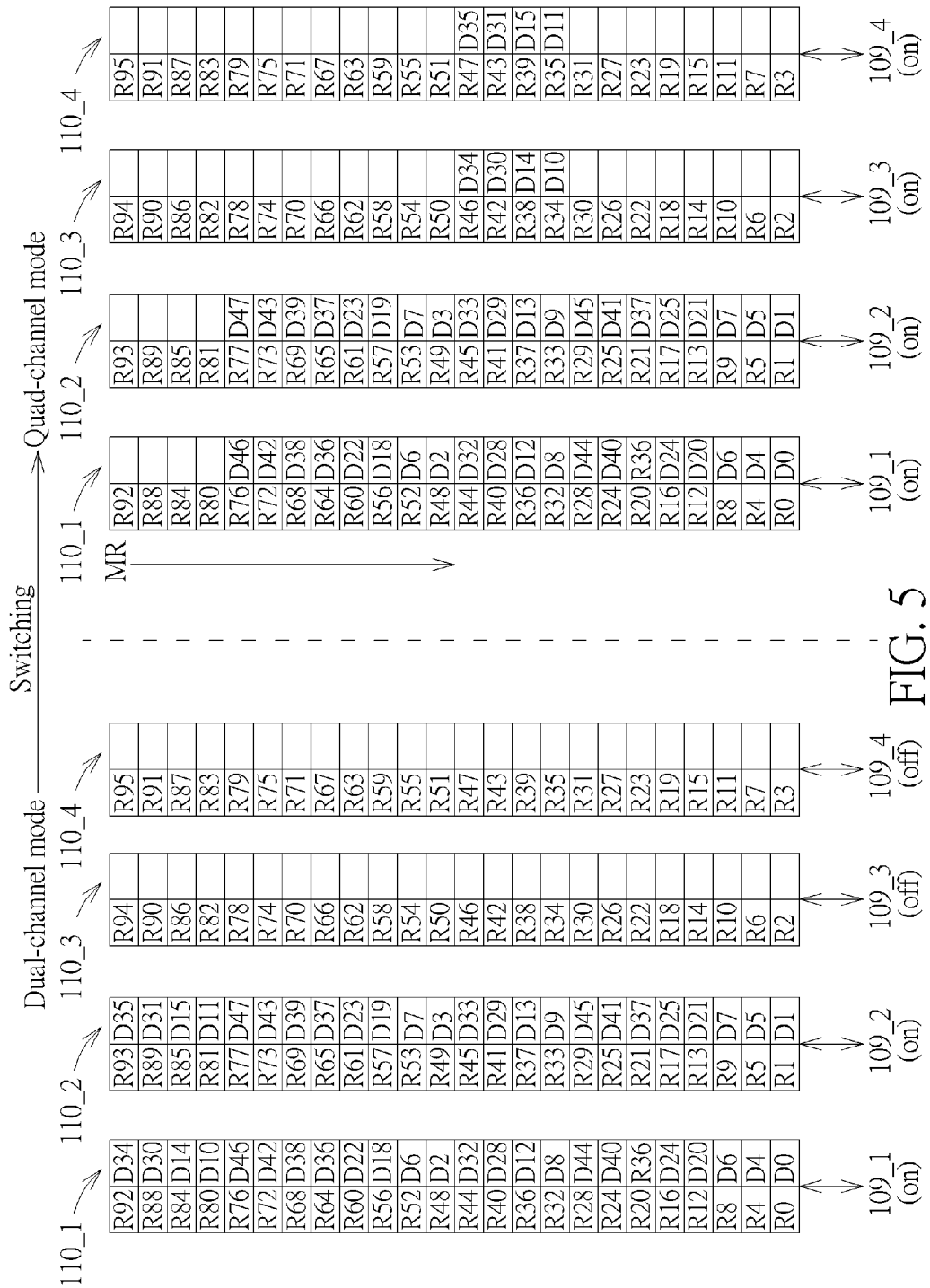

FIG. 4 and FIG. 5 are diagrams illustrating an example of managing the multi-channel memory device 102 according to a third embodiment of the present invention. As shown in FIG. 4, the multi-channel memory device 102 may include four memory areas 110_1-110_K (K=4) that may be accessed via four memory channels 109_1-109_K (K=4). When the multi-channel memory device 102 is controlled to operate under an M-channel mode (e.g., dual-channel mode with M=2), the memory areas 110_1-110_2 and the associated memory channels 109_1-109_2 may be active, while the memory areas 110_3-110_4 and the associated memory channels 109_3-109_4 may be disabled (e.g. powered down) or may enter the power-saving mode (e.g., self-refresh mode or other operation mode with power consumption lower than the normal mode). That is, the multi-channel memory device 102 may be partially active under the M-channel mode (e.g., dual-channel mode with M=2). When the multi-channel memory device 102 is controlled to operate under an N-channel mode (e.g., quad-channel mode with N=K=4=2× M), the memory areas 110_1-110_4 and the associated memory channels 109_1-109_4 may be active. That is, the multi-channel memory device 102 may be fully active under the N-channel mode (e.g., quad-channel mode with N=K=4=2×M).

As shown in FIG. 4, the memory area 110_1 may include a plurality of memory regions R0, R4, R8, ..., R92; the memory area 110_2 may include a plurality of memory regions R1, R5, R9, ..., R93; the memory area 110_3 may include a plurality of memory regions R2, R6, R10, ..., R94; and the memory area 110_4 may include a plurality of memory regions R3, R7, R11, ..., R95. In this embodiment, a quad-channel memory space composed of memory regions R0-R47 may be used in the quad-channel mode, where four memory regions may be accessed in parallel according to a memory address set. With regard to the quad-channel mode, each memory address set may include four adjacent memory addresses that may be equally spaced by the same offset, where the offset may be adjusted, depending upon the actual design consideration. For example, four memory regions R0-R3 may be accessed by using a memory address set, four memory regions R4-R7 may be accessed by using a memory address set, and four memory regions R8-R11 may be accessed by using a memory address set. Hence, when the multi-channel memory device 102 is controlled to operate in the N-channel mode (e.g., quad-channel mode with N=4), data D0-D47 may be accessed in the memory regions R0-R47, respectively.

When the multi-channel memory device 102 is controlled to switch from the N-channel mode (e.g., quad-channel mode with N=4) to the M-channel mode (e.g., dual-channel mode with M=2), valid data in one partial memory space at L memory channels (which may be across the memory channels 109_3 and 109_4 and may be composed of memory regions R2, R3, R6, R7, ..., R46, R47, if L=2) may be controlled by the memory access controlling circuit 103 (particularly, DMA controller 106) to migrate to another partial memory space at M memory channels (which may be across the memory channels 109_1 and 109_2 and may be composed of memory regions R48, R49, R52, R53, ..., R92, R93, if M=2). For example, assuming that all of the stored data D2, D3, D6, D7, ..., D46, D47 in the memory regions R2, R3, R6, R7, ..., R46, R47 may be valid data, the stored data D2, D3, D6, D7, ..., D46, D47 may be controlled to migrate to the memory regions R48, R49, R52, R53, ..., R92, R93, as shown in the left part of FIG. 4. With regard to the dual-channel mode, each memory address set may include two adjacent memory addresses that may be equally spaced by the same offset, where the offset may be adjusted, depending upon the actual design consideration. As a result, a group of data D0, D1, D2, D3 may be accessed by using two different memory address sets, including one memory address set directed to memory regions R0 and R1 and the other memory address set directed to the memory regions R48 and R49. Similarly, a group of data D4, D5, D6, D7 may be accessed by using two different memory address sets, including one memory address set directed to memory regions R4 and R5 and the other memory address set directed to the memory regions R52 and R53; and a group of data D44, D45, D46, D47 may be accessed by using two different memory address sets, including one memory address set directed to memory regions R44 and R45 and the other memory address set directed to the memory regions R92 and R93.

Before the multi-channel memory device 102 is controlled to enter the M-channel mode (e.g., dual-channel mode with M=2), any of the high bandwidth engines 10 and the low bandwidth engines 12 may issue read/write requests for accessing a memory space that may be composed of memory regions R0-R47 and may be across the memory channels 109_1-109_4. In addition, when the multi-channel memory device 102 is controlled to operate in the M-channel mode (e.g., dual-channel mode with M=2), any of the high bandwidth engines 10 and the low bandwidth engines 12 may issue read/write requests for accessing a memory space that may be composed of memory regions R0, R1, R4, R5, ..., R92, R93 and may be across the memory channels 109_1 and 109_2. By way of example, but not limitation, a proposed sorting operation may be performed when the multi-channel memory device 102 is in the N-channel mode (e.g., quad-channel mode with N=4), may be performed when the multi-channel memory device 102 is in the M-channel mode (e.g., dual-channel mode with M=2), or may be performed while the multi-channel memory device 102 is being switched from the N-channel mode (e.g., quad-channel mode with N=4) to the M-channel mode (e.g., dual-channel mode with M=2). Hence, after, when or before the multi-channel memory device is controlled to operate in the M-channel mode, the proposed sorting operation may be performed to sort stored data of memory regions in a memory space according to a bandwidth requirement order. To put it simply, the proposed sorting operation may be performed at any time as long as it is done before the multi-channel memory device 102 is switched from the M-channel mode (e.g., dual-channel mode with M=2) to the N-channel mode (e.g., quad-channel mode with N=4). For clarity and simplicity, the following assumes that the proposed sorting operation may be performed when the multi-channel memory device 102 is in the M-channel mode (e.g., dual-channel mode with M=2). However, this is for illustrative purposes only, and is not meant to be a limitation of the present invention.

In this embodiment, when the multi-channel memory device 102 is controlled to operate in the M-channel mode (e.g., dual-channel mode with M=2), the memory access controlling circuit 103 (particularly, DMA controller 106) may perform a sorting operation upon stored data of memory regions R0, R1, R4, R5, . . . , R92, R93 in the memory space across the M memory channels 109_1, 109_2 used under the M-channel mode according to a bandwidth requirement order BR. For example, the bandwidth requirement order BR may be a descending order, such that a memory region addressed by a higher memory address may be controlled to store data accessed by a high bandwidth engine and/or may have higher access frequency, and a memory region addressed by a lower memory address may be controlled to store data accessed by a low bandwidth engine and/or may have lower access frequency. For another example, the bandwidth requirement order BR may be an ascending order, such that a memory region addressed by a higher memory address may be controlled to store data accessed by a low bandwidth engine and/or may have lower access frequency, and a memory region addressed by a lower memory address may be controlled to store data accessed by a high bandwidth engine and/or may have higher access frequency. To put it simply, the bandwidth requirement order BR may be adjusted, depending upon actual design considerations. In one example, the sorting operation can be performed dynamically. In another example, the sorting operation can be performed at least partially by any unit capable of running software.

For clarity and simplicity, the following assumes that the bandwidth requirement order BR may be set by a descending order, as shown in the right part of FIG. 4. Hence, with regard to the memory regions R0, R1, R4, R5, . . . , R44, R45, the sorting operation performed by the DMA controller 106 may ensure that data accessed by high bandwidth engines 10 and/or associated with higher access frequency is stored in memory regions addressed by higher memory addresses and data accessed by low bandwidth engines 12 and/or associated with lower access frequency is stored in memory regions addressed by lower memory addresses. Similarly, with regard to the memory regions R48, R49, R52, R53, . . . , R92, R93, the sorting operation performed by the DMA controller 106 may also ensure that data accessed by high bandwidth engines 10 and/or associated with higher access frequency is stored in memory regions addressed by higher memory addresses and data accessed by low bandwidth engines 12 and/or associated with lower access frequency is stored in memory regions addressed by lower memory addresses. For example, before the sorting operation is performed, one group of data D8, D9, D10, D1 stored in the memory regions R8, R9, R56, R57 and another group of data D12, D13, D14, D15 stored in the memory regions R12, R13, R60, R61 may be accessed by one high bandwidth engine 10 and/or may be associated with higher access frequency; and one group of data D28, D29, D30, D31 stored in the memory regions R28, R29, R76, R77 and another group of data D32, D33, D34, D35 stored in the memory regions R32, R33, R80, R81 may be accessed by another high bandwidth engine 10 and/or may be associated with higher access frequency. After the sorting operation is performed, the group of data D8, D9, D10, D11 may be stored in the memory regions R32, R33, R80, R81, the group of data D12, D13, D14, D15 may be stored in the memory regions R36, R37, R84, R85, the group of data D28, D29, D30, D31 may be stored in the memory regions R40, R41, R88, R89, and the group of data D32, D33, D34, D35 may be stored in the memory regions R44, R45, R92, R93.

When the multi-channel memory device 102 is controlled to switch from the M-channel mode (e.g., dual-channel mode with M=2) to the N-channel mode (e.g., quad-channel mode with N=4), the memory access controlling circuit 103 may control data of memory regions in a partial memory space (which may be composed of memory regions R48, R49, R52, R53, . . . , R92, R93 and may be across M memory channels 109_1, 109_2 used under the M-channel mode, if M=2) to migrate to another partial memory space (which may be composed of memory regions R2, R3, R6, R7, . . . , R46, R47 and may be at L memory channels 109_3, 109_4 not used under the M-channel mode, if L=2). In this embodiment, the DMA controller 106 may perform data migration upon memory regions in the partial memory space (which may be composed of memory regions R48, R49, R52, R53, . . . , R92, R93 and may be across M memory channels 109_1, 109_2 used under the M-channel mode, if M=2) according to a predetermined memory address order MR of the memory regions R48, R49, R52, R53, . . . , R92, R93. For example, the aforementioned bandwidth requirement order BR may match the memory address order MR.

As shown in the right part of FIG. 5, the memory access controlling circuit 103 (particularly, DMA controller 106) may perform data migration upon data D34, D35 stored in the memory regions R92, R93 at a first time point T1, may perform data migration upon data D30, D31 stored in the memory regions R88, R89 at a second time point T2 immediately following the first time point T1, may perform data migration upon data D14, D15 stored in the memory regions R84, R85 at a third time point T3 immediately following the second time point T2, and may perform data migration upon data D10, D11 stored in the memory regions R80, R81 at a fourth time point T4 immediately following the third time point T3. In this way, the high bandwidth requirement may be satisfied in a short time. For example, the high bandwidth engine may get the desired memory bandwidth in a short time.

Each of the proposed memory management technique shown in FIG. 2, the proposed memory management technique shown in FIG. 3, and the proposed memory management technique shown in FIGS. 4-5 may be employed to reduce the channel switch response time. In above exemplary embodiments, only one of the proposed memory management techniques is employed by a memory system. However, this is for illustrative purposes only, and is not meant to be a limitation of the present invention. Alternatively, the memory system 100 may be modified to employ more than one proposed memory management technique. For example, both of the proposed memory management technique shown in FIG. 2 and the proposed memory management technique shown in FIG. 3 may be employed in the same memory system. For another example, both of the proposed memory management technique shown in FIG. 2 and the proposed memory management technique shown in FIGS. 4-5 may be employed in the same memory system. These alternative designs all fall within the scope of the present invention.

With regard to the multi-channel memory management example shown in FIG. 2, the memory system 100 may only let the high bandwidth engines 10 to use the reserved partial memory space 202 when doing channel switching from the M-channel mode (e.g., dual-channel mode with M=2) to the N-channel mode (e.g., quad-channel mode with N=4). In this example, the reserved partial memory space 202 may be across all memory channels possessed by the multi-channel memory device 102. However, this is for illustrative purposes only, and is not meant to be a limitation of the present invention. In an alternative design, a partial memory space of the multi-channel memory device 102 that is not used under the M-channel mode (e.g., dual-channel mode with M=2) may be reserved to be used by high bandwidth engines 10 upon channel switching from the M-channel mode (e.g., dual-channel mode with M=2) to the N-channel mode (e.g., quad-channel mode with N=4).

Figure 6:
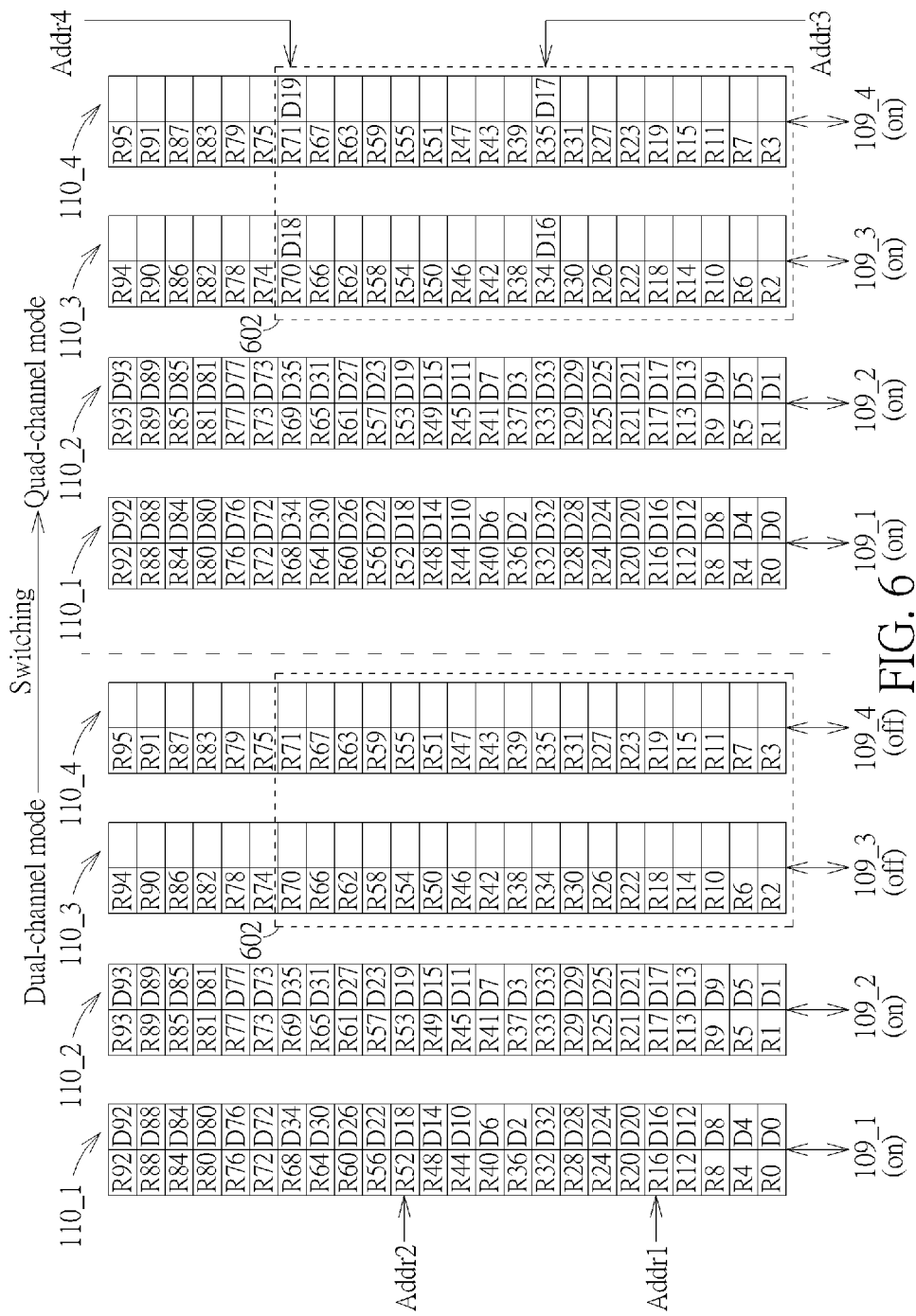
FIG. 6 is a diagram illustrating an example of managing a multi-channel memory device according to a fourth embodiment of the present invention.

FIG. 6 is a diagram illustrating an example of managing a multi-channel memory device according to a fourth embodiment of the present invention. The only difference between the multi-channel memory management examples shown in FIG. 2 and FIG. 6 is the design of the reserved partial memory space allocation. In this embodiment shown in FIG. 6, when the multi-channel memory device 102 is controlled to operate in the M-channel mode (e.g., dual-channel mode with M=2), a partial memory space 602 (which may be across the memory channels 109_3-109_4 and may be composed of memory regions R2, R3, . . . , R70 and R71) may be reserved by the memory access controlling circuit 103. Since the partial memory space 602 may be reserved at the memory channels 109_3 and 109_4 that may be disabled (e.g. powered down) or may enter the power-saving mode (e.g., self-refresh mode or other operation mode with power consumption lower than the normal mode) under the M-channel mode (e.g., dual-channel mode with M=2), the partial memory space 602 may be blocked from being used under the M-channel mode (e.g., dual-channel mode with M=2). In addition, since the memory channels 109_3 and 109_4 may be enabled under the N-channel mode (e.g., quad-channel mode with N=4), the partial memory space 602 may be allowed to be used under the N-channel mode (e.g., quad-channel mode with N=4).

The behavior of the reserved partial memory space 602 may be the same as that of the reserved partial memory space 202. For example, the reserved partial memory space 602 may have no valid data stored therein when the multi-channel memory device 102 is controlled to operate in the M-channel mode (e.g., dual-channel mode with M=2). Since the reserved partial memory space 602 may be empty or have no valid data at the time the N-channel mode (e.g., quad-channel mode with N=4) is enabled, the reserved partial memory space 602 may be ready to satisfy the high memory bandwidth requirement. That is, the reserved partial memory space 602 may be ready to serve memory access requests issued from high bandwidth engines 10. For another example, before, when or after the multi-channel memory device 102 is controlled to switch from the N-channel mode (e.g., quad-channel mode with N=4) to the M-channel mode (e.g., dual-channel mode with M=2), data migration may be performed upon the memory channels 109_3 and 109_4, such that any valid data in memory regions at the memory channels 109_3 and 109_4, including valid data in the partial memory space 602, may be controlled to migrate to a partial memory space composed of unused memory regions at the memory channels 109_1-109_2 used under the N-channel mode (e.g., quad-channel mode with N=4), as illustrated in the left part of FIG. 6. Hence, the partial memory space 602 may become an empty partial memory space or may have no valid data when the multi-channel memory device 102 is controlled to operate in the M-channel mode (e.g., dual-channel mode with M=2).

When the multi-channel memory device 102 is controlled to switch from the M-channel mode (e.g., dual-channel mode with M=2) to the N-channel mode (e.g., quad-channel mode with N=4), the memory access controlling circuit 103 may perform data access in the reserved partial memory space 602 for satisfying the high memory bandwidth requirement (e.g., memory access requests issued from high bandwidth engines 10). For example, when the multi-channel memory device 102 is controlled to switch from the M-channel mode (e.g., dual-channel mode with M=2) to the N-channel mode (e.g., quad-channel mode with N=4), a first engine (e.g., high bandwidth engine 10) may access data in the reserved partial memory space 602 across the memory channels 109_3-109_4, and a second engine (e.g., low bandwidth engine 12) may not access data in the reserved partial memory space 602 across the memory channels 109_3-109_4, where a bandwidth requirement of the first engine is higher than a bandwidth requirement of the second engine.

In addition, when the multi-channel memory device 102 is controlled to switch from the M-channel mode (e.g., dual-channel mode with M=2) to the N-channel mode (e.g., quad-channel mode with N=4), valid data in one partial memory space at M memory channels (which may be across the memory channels 109_1 and 109_2, if M=2) may be controlled by the memory access controlling circuit 103 (particularly, DMA controller 106) to migrate to another partial memory space at L memory channels (which may be across the memory channels 109_3 and 109_4, if L=2). Consider a case where data D18 and D19 stored in the memory regions R52 and R53 does not migrate to the memory regions R18 and R19 yet, and a group of data D16, D17, D18, D19 stored in the memory regions R16, R17, R52, R53 is requested by a high bandwidth engine 10. The high bandwidth engine 10 may first access old data D16, D17, D18, D19 stored in the memory regions R16, R17, R52, R53 at two memory address sets Addr1 and Addr2, and then may access following new data D16, D17, D18, D19 in the memory regions R34, R35, R70, R71 at memory address sets Addr3 and Addr4, as illustrated in the right part of FIG. 6. It should be noted that, in this embodiment, the memory regions R34, R35, R70 and R71 belong to the reserved partial memory space 602.

Since a person skilled in the art can readily understand how to manage data access of the reserved partial memory space 602 shown in FIG. 6 after reading above paragraphs directed to the multi-channel memory management example shown in FIG. 2, further details are omitted here for brevity.

With regard to each of the aforementioned multi-channel memory management examples shown in FIGS. 2-6, channel switching from the M-channel mode (e.g., dual-channel mode with M=2) to the N-channel mode (e.g., quad-channel mode with N=4) may be accompanied by a data migration operation. However, this is for illustrative purposes only, and is not meant to be a limitation of the present invention. Alternatively, the data migration operation in each of the aforementioned multi-channel memory management examples shown in FIGS. 2-6 may be omitted. For example, when channel switching from the M-channel mode (e.g., dual-channel mode with M=2) to the N-channel mode (e.g., quad-channel mode with N=4), the new data may be stored in the memory region(s) that were not used in the M-channel mode, so that the master devices (e.g., high bandwidth engines 10 and/or low bandwidth engines 12) may access old data in the memory region(s) that were used in the M-channel mode and access new data in the memory region(s) that were not used in the M-channel mode.

For one example, when the mode controlling module 108 controls the multi-channel memory device 102 to switch from the M-channel mode (e.g., dual-channel mode with M=2) to the N-channel mode (e.g., quad-channel mode with N=4), the mode controlling module 108 may notify the master devices of certain memory regions upon which data access can be performed, and then the master devices may access (read/write) requested data in the multi-channel memory device 102 through the memory access controlling circuit 103. By way of example, but not limitation, a master device may passively receive the memory data arrangement information from the mode controlling mode 108, and may refer to the received memory data arrangement information to issue memory access requests to the memory system 100.

For another example, when the mode controlling module 108 controls the multi-channel memory device 102 to switch from the M-channel mode (e.g., dual-channel mode with M=2) to the N-channel mode (e.g., quad-channel mode with N=4), the master devices may detect or know certain memory regions upon which data access can be performed, and then may access (read/write) requested data in the multi-channel memory device 102 through the memory access controlling circuit 103. By way of example, but not limitation, a master device may actively identify the memory data arrangement without information given from the mode controlling mode 108, and may refer to the identified memory data arrangement to issue memory access requests to the memory system 100.

To put it simply, the high bandwidth engines 10 and the low bandwidth engine 12 may access the multi-channel memory device 102 through the memory access controlling circuit 103 under a condition that there is no data migration performed at the time the memory system 100 has channel switching from the M-channel mode (e.g., dual-channel mode with M=2) to the N-channel mode (e.g., quad-channel mode with N=4). With moderate modifications made to multi-channel memory management designs shown in FIGS. 2-6, modified multi-channel memory management designs, each having no data migration accompanying channel switching from the M-channel mode (e.g., dual-channel mode with M=2) to the N-channel mode (e.g., quad-channel mode with N=4), can be obtained.

In accordance with a first modified multi-channel memory management design, when channel switching from the M-channel mode (e.g., dual-channel mode with M=2) to the N-channel mode (e.g., quad-channel mode with N=4) as shown in FIG. 2 occurs, the memory access controlling circuit 103 may perform data access in the reserved partial memory space 202 without doing a concurrent data migration task for controlling data of a partial memory space at M memory channels used under the M-channel mode to migrate to a partial memory space at L memory channels not used under the M-channel mode. For example, when the channel switching from the M-channel mode (e.g., dual-channel mode with M=2) to the N-channel mode (e.g., quad-channel mode with N=4) is performed with no data migration, the high bandwidth engine 10 may perform a data access operation to first access old data in a partial memory space at the M memory channels and then access new data in the reserved partial memory space 202. For another example, when the channel switching from the M-channel mode (e.g., dual-channel mode with M=2) to the N-channel mode (e.g., quad-channel mode with N=4) is performed with no data migration, the high bandwidth engine 10 may perform a data access operation to access data in the reserved partial memory space 202, and the low bandwidth engine 12 may not perform a data access operation to access data in the reserved partial memory space 202.

In accordance with a second modified multi-channel memory management design, when channel switching from the M-channel mode (e.g., dual-channel mode with M=2) to the N-channel mode (e.g., quad-channel mode with N=4) as shown in FIG. 6 occurs, the memory access controlling circuit 103 may perform data access in the reserved partial memory space 602 without doing a concurrent data migration task for controlling data of a partial memory space at M memory channels used under the M-channel mode to migrate to a partial memory space at L memory channels not used under the M-channel mode. For example, when the channel switching from the M-channel mode (e.g., dual-channel mode with M=2) to the N-channel mode (e.g., quad-channel mode with N=4) is performed with no data migration, the high bandwidth engine 10 may perform a data access operation to first access old data in a partial memory space at the M memory channels and then access new data in the reserved partial memory space 602. For another example, when the channel switching from the M-channel mode (e.g., dual-channel mode with M=2) to the N-channel mode (e.g., quad-channel mode with N=4) is performed with no data migration, the high bandwidth engine 10 may perform a data access operation to access data in the reserved partial memory space 602, and the low bandwidth engine 12 may not perform a data access operation to access data in the reserved partial memory space 602.

In accordance with a third modified multi-channel memory management design, when channel switching from the M-channel mode (e.g., dual-channel mode with M=2) to the N-channel mode (e.g., quad-channel mode with N=4) as shown in FIG. 3 occurs, the memory access controlling circuit 103 may refer to recorded memory addresses of memory regions associated with a high memory bandwidth requirement (e.g., memory regions accessed by high bandwidth engines 10 and/or memory regions with access frequency higher than a threshold) to access data of at least one first memory region in one partial memory space at M memory channels (which may be composed of memory regions R0, R1, . . . , R92, R93 and may be across M memory channels 109_1, 109_2 used under the M-channel mode, if M=2) before accessing data of at least one second memory region in one partial memory space at M memory channels (which may be composed of memory regions R0, R1, . . . , R92, R93 and may be across M memory channels 109_1, 109_2 used under the M-channel mode, if M=2), where a bandwidth requirement associated with the at least one first memory region may be higher than a bandwidth requirement associated with the at least one second memory region. For example, the at least one first memory region may be accessed by a first engine (e.g., high bandwidth engine 10), the at least one second memory region may be accessed by a second engine (e.g., low bandwidth engine 12), and a bandwidth requirement of the first engine may be higher than a bandwidth requirement of the second engine. Since the priority of performing data access upon memory regions associated with a high memory bandwidth requirement (e.g., memory regions accessed by high bandwidth engines 10 and/or memory regions with access frequency higher than a threshold) may be higher than the priority of performing data access upon memory regions associated with a low memory bandwidth requirement (e.g., memory regions accessed by low bandwidth engines 12 and/or memory regions with access frequency not higher than the threshold) when the multi-channel memory device 102 is controlled to switch from the M-channel mode (e.g., dual-channel mode with M=2) to the N-channel mode (e.g., quad-channel mode with N=4), the high bandwidth requirement may be satisfied in a short time. For example, the high bandwidth engine 10 may get the desired memory bandwidth in a short time.

In accordance with a fourth modified multi-channel memory management design, when channel switching from the M-channel mode (e.g., dual-channel mode with M=2) to the N-channel mode (e.g., quad-channel mode with N=4) as shown in FIG. 5 occurs, the memory access controlling circuit 103 may refer to a memory address order MR configured based on a bandwidth requirement order BR for managing data access in memory regions at the memory channels that are used in the M-channel mode (which may be composed of memory regions R0, R1, . . . , R92, R93 and may be across M memory channels 109_1, 109_2 used under the M-channel mode, if M=2). As mentioned above, after, when or before the multi-channel memory device 102 is controlled to operate in the M-channel mode, a proposed sorting operation may be performed to sort stored data of memory regions in the memory space according to the bandwidth requirement order BR. For example, the bandwidth requirement order BR may be a descending order or an ascending order, depending upon actual design considerations.

Since the stored data are intentionally sorted in the bandwidth requirement order BR, the memory access controlling circuit 103 may refer to the memory address order MR (which is configured based on the bandwidth requirement order BR) to access data of at least one first memory region in one partial memory space at M memory channels (which may be composed of memory regions R0, R1, . . . , R92, R93 and may be across M memory channels 109_1, 109_2 used under the M-channel mode, if M=2) before accessing data of at least one second memory region in one partial memory space at M memory channels (which may be composed of memory regions R0, R1, . . . , R92, R93 and may be across M memory channels 109_1, 109_2 used under the M-channel mode, if M=2), where a bandwidth requirement associated with the at least one first memory region may be higher than a bandwidth requirement associated with the at least one second memory region. For example, the at least one first memory region may be accessed by a first engine (e.g., high bandwidth engine 10), the at least one second memory region may be accessed by a second engine (e.g., low bandwidth engine 12), and a bandwidth requirement of the first engine may be higher than a bandwidth requirement of the second engine. Since the memory address order MR (which is configured based on the bandwidth requirement order BR) can ensure that the priority of performing data access upon memory regions associated with a high memory bandwidth requirement (e.g., memory regions accessed by high bandwidth engines 10 and/or memory regions with access frequency higher than a threshold) is higher than the priority of performing data access upon memory regions associated with a low memory bandwidth requirement (e.g., memory regions accessed by low bandwidth engines 12 and/or memory regions with access frequency not higher than the threshold) when the multi-channel memory device 102 is controlled to switch from the M-channel mode (e.g., dual-channel mode with M=2) to the N-channel mode (e.g., quad-channel mode with N=4), the high bandwidth requirement may be satisfied in a short time. For example, the high bandwidth engine 10 may get the desired memory bandwidth in a short time.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A method for managing a multi-channel memory device comprising:
   when the multi-channel memory device is controlled to switch from an M-channel mode to an N-channel mode, accessing data of at least one first memory region in a partial memory space at M memory channels used under the M-channel mode before accessing data of at least one second memory region in the partial memory space at the M memory channels used under the M-channel mode;
   wherein M and N are positive integers and M is smaller than N; and a bandwidth requirement associated with all data of the at least one first memory region is higher than a bandwidth requirement associated with all data of the at least one second memory region.

2. The method of claim 1, wherein the M memory channels are included in N memory channels used under the N-channel mode.

3. The method of claim 1, further comprising:
   recording a memory address of the at least one first memory region under the M-channel mode;
   wherein accessing data of the at least one first memory region in the partial memory space at the M memory channels used under the M-channel mode comprises:
   referring to the recorded memory address of the at least one first memory region for performing data access upon the at least one first memory region in the partial memory space at the M memory channels.

4. The method of claim 1, further comprising:
   when or before the multi-channel memory device is controlled to operate in the M-channel mode, sorting stored data of memory regions in a memory space according to a bandwidth requirement order;
   wherein accessing data of the at least one first memory region in the partial memory space at the M memory channels used under the M-channel mode comprises:
   performing data access upon memory regions in the partial memory space at the M memory channels according to a predetermined memory address order of the memory regions.

5. A memory control system for managing a multi-channel memory device comprising:
   a mode controlling module, arranged to control the multi-channel memory device to switch from an M-channel mode to an N-channel mode, wherein M and N are positive integers, and M is smaller than N; and
   a memory access controlling circuit, wherein when the multi-channel memory device is controlled to switch from the M-channel mode to the N-channel mode, the memory access controlling circuit is arranged to access data of at least one first memory region in a partial memory space at M memory channels used under the M-channel mode before accessing data of at least one second memory region in the partial memory space at the M memory channels used under the M-channel mode, where a bandwidth requirement associated with all data of the at least one first memory region is higher than a bandwidth requirement associated with all data of the at least one second memory region.

6. The memory control system of claim 5, wherein the M memory channels are included in N memory channels used under the N-channel mode.

7. The memory control system of claim 5, wherein the memory access controlling circuit is further arranged to record a memory address of the at least one first memory region under the M-channel mode; and the memory access controlling circuit refers to the recorded memory address of the at least one first memory region for performing data access upon the at least one first memory region in the partial memory space at the M memory channels.

8. The memory control system of claim 5, wherein when or before the multi-channel memory device is controlled to operate in the M-channel mode, the memory access controlling circuit is further arranged to sort stored data of memory regions in a memory space according to a bandwidth requirement order, where the memory access controlling circuit performs data access upon memory regions in the partial memory space at the M memory channels according to a predetermined memory address order of the memory regions.

* * * * *